Aug. 12, 1941.  J. FLAWS, JR  2,252,499
CONTROL APPARATUS
Filed April 27, 1939

Inventor:
John Flaws, Jr.,
by Harry E. Dunham
His Attorney.

Patented Aug. 12, 1941

2,252,499

UNITED STATES PATENT OFFICE 2,252,499

CONTROL APPARATUS

John Flaws, Jr., East Cleveland, Ohio, assignor to General Electric Company, a corporation of New York Application April 27, 1939, Serial No. 270,435

2 Claims. (Cl. 198—21)

My invention relates to control apparatus operable by the presence or absence of an article along a path of movement to control associated apparatus, and more particularly to control apparatus operated by a jet of air directed across the path of movement of a stem, flared stem tube, etc., of an incandescent lamp or the like. My invention also relates to apparatus in combination with said control apparatus for transferring articles from the holders of one conveyor to those of another conveyor for the storage thereof.

Most lamp parts, such as the flared vitreous stem tubes and stems are both light in weight and easily injured and the principal object of my invention is to provide apparatus operable either by the presence or absence of such articles along a path of movement for the control of associated apparatus. Control apparatus of this nature can be used to govern the operation of feeding apparatus, such as the flare feeding apparatus disclosed in my application of even date, Serial No. 270,434, so that said feeding apparatus provides a constant supply. The control apparatus may also be applied to the feeding of articles of the type referred to above from a constant reserve supply to apparatus requiring said articles only under certain conditions. The latter form of apparatus may be any of the stem manufacturing and filament mounting mechanisms which require the feeding thereto of flared stem tubes or other items only if certain other lamp parts have already been fed thereinto.

Another object of my invention is to provide apparatus for controlling the transferring and storing of stems advanced by a source of non-uniform supply. Such apparatus is disclosed in detail in the annexed specification.

Other features and advantages of my invention will be apparent from the detailed description which follows and from the accompanying drawing of one species thereof.

Figure 1:
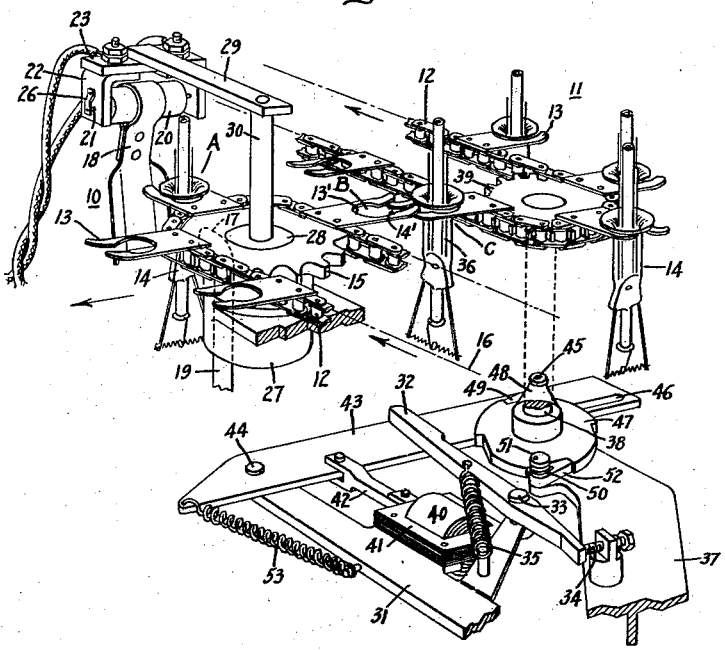
Figure 2:
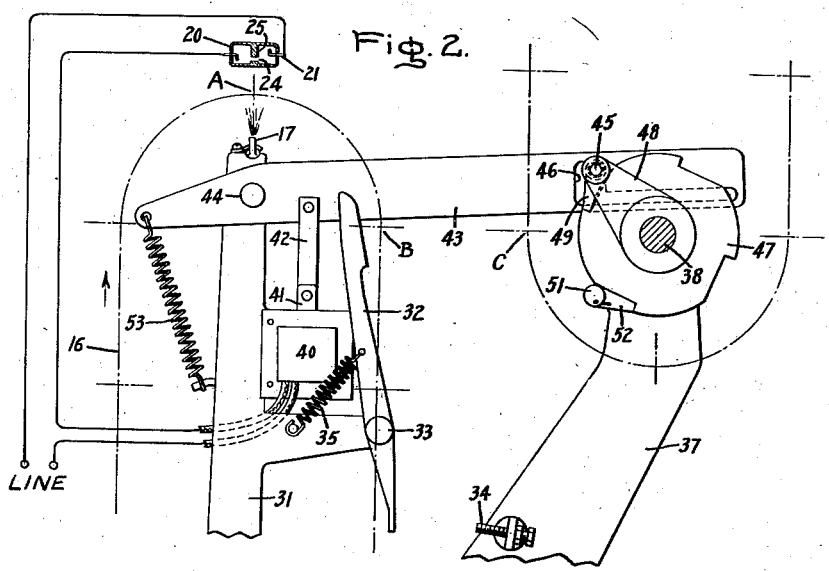

In the drawing Fig. 1 is a perspective view of a supply conveyor for advancing stem tubes, and a stem transferring, storing and control apparatus comprising my invention in combination therewith, with the upper and lower portions thereof shown separated from each other for clearness; and Fig. 2 is a plan view of the transfer and control apparatus with the path of movement followed by the stems indicated in proper relation thereto.

In the manufacture of incandescent lamps, automatically advancing conveyors are used to carry stems from one station to another, as well as to remove and store excess and defective stems. These conveyors are usually of the type shown at 10 and 11 in Fig. 1 and comprise an endless chain 12 having holders 13 for the stems 14 at regular intervals therealong. The conveyors advance the said holders 13 by an intermittent indexing movement. The linkage of the chain 12 allows the conveyor to be moved in any direction desired and the conveyor 10 and the sprocket 15 shown, can represent either the endmost terminal of the conveyor adjacent the point the stems 14 are removed therefrom, or the end of a side branch followed by said conveyor on its return to the loading station.

In the instance shown, an excess of stems 14 is advanced to the unloading station of the supply conveyor 10 and the apparatus comprising my invention is used to automatically remove and store the unused stems onto the storage conveyor 11, so that none are returned to the loading station of conveyor 10 to interfere with its operation. The stems 14 are ordinarily taken from the conveyor 10 by hand as needed before reaching station A, and when advanced to that portion thereof shown, may be contained in any of the holders in a very hit and miss fashion. To transfer the stems 14 to the storage conveyor 11 in this relation, is not desirable as only a portion of the holders 13 thereof would be used and said conveyor 11 would have to be of greater length than practical. To avoid these disadvantages, suitable control apparatus is provided in combination with the apparatus for automatically transferring the stems from conveyor 10 to conveyor 11, for causing the conveyor 11 to index empty holders 13 into the receiving station only as required.

The control apparatus makes its observations as to the presence or absence of stems 14 in the holders 13 of the conveyor 10 at a point along the path of movement thereof, ahead of that at which the transferring takes place, and as shown, is located opposite station A along the path 16. At this station A, any stem 14 contained in the holder 13, is located between the air nozzle 17 and the vane 18 and blocks off a stream of air issuing from said nozzle toward said vane. Normally, the holder 13 does not contain a stem 14 and the air conducted to the nozzle 17 from a source (not shown) through the pipe 19, strikes the vane 18, which is fastened to the mercury switch 20, and turns both the vane and the switch to another position. The mercury switch 20 is cylindrical in shape and is mounted through stiff metal terminals 21 extending from opposite ends thereof, which are located in apertures in the metal angles 22 at opposite ends of the bar 23 of insulating material. When the air pressure strikes the vane 18, the switch 20 is turned on its terminals 21 so that the hole 24 (Fig. 2) in the insulating partition 25 dividing said switch, is held above the mercury in the opposite ends of the switch and the electrical circuit therethrough is incomplete. Electrical connections are made to the switch 20 through a metal leaf spring 26 on each of the metal angles 22, which engages the end of the terminal 21 held thereby.

Should a stem 14 be carried by the holder 13 entering station A, however, the stream of air is blocked off by the stem tube and the weight of the vane 18 is sufficient to cause it to swing down, thereby turning the mercury switch 20 so that the hole 24 is carried below the surface of the mercury pools and they flow together, completing the electrical circuit. This function of the switch 20 is the governing operation of the control apparatus and in this particular instance is used to bring about the indexing of the storage conveyor 11 to advance an empty holder 13 thereof into position to receive the stem 14.

In some instances it may be more desirable to have a normally complete circuit through the switch 20 when an article (stem) does not block the stream of air, and the vane 18 is in its lower position to effect the control desired. To bring about this method of operation, the vane 18 is clamped to the switch 20 in a different relation to the hole 24 in the partition 25 placing said hole 24 on the opposite side of the axis of rotation so that the rotation of the switch carries the hole 24 above the surface of the mercury pools and breaks the circuit therethrough.

No other operations take place while the stem 14 is located at station A and it is not until the holder 13 and the stem 14 are indexed into station B that the transferring operation occurs. The transferring operation is brought about automatically by a separate sideward movement of the sprocket 15 occurring after each indexing movement of the conveyor 10 in the usual manner of operation thereof, which carries the end of the holder 13 at station B over toward a cooperating holder 13 on conveyor 11 at station C until they overlap. This sideward motion of the sprocket 15 is created through the bracket 27 which supports the pin 28 carrying said sprocket, to cause a single holder 13 to be advanced into the loading station thereof, without causing other holders 13 carrying the stems 14 to be disturbed at this moment. The bracket 27 also carries the air nozzle 17 and the pipe 19 of the control apparatus which is attached directly thereto, and the insulating bar 23 which is attached thereto through the bar 29 and the rod 30 extending through a central hole in the pin 28. This construction prevents the control apparatus from being disturbed by the sideward motion of the said bracket 27 and the conveyor 10 in any way.

During the sideward movement of the bracket 27, a lower portion 31 thereof (shown separated therefrom in Fig. 1) is also displaced, and one end of the lever 32 which is pivoted on the pin 33 extending therefrom, engages the stationary stop screw 34, turning said lever 32 so that its other end engages the stem 14 and pushes it into the holder 13 of the conveyor 11. This motion stretches the spring 35 which extends between said lever 32 and a post extending from bracket 31 and which normally keeps said lever 32 back from the path of movement of the stem 14. The taper of the flared upper end of the stem tube 36 is such that the sideward pressure thereon easily raises it from the enlarged opening 13' in the holder 13 and carries the round body portion thereof through the end openings 14' in both holders 13 and onto the enlarged opening in the holder 13 of the conveyor 11. The stop screw is mounted in a post extending upward from the bracket 37 which is mounted on a stationary standard (not shown) on the floor and which carries the shaft 38 on which the end sprocket 39 of the conveyor 11 is mounted.

All further movements of the apparatus other than the return of the conveyor 10 to its earlier position, are governed by the control apparatus and the presence of a stem 14 at station A. If a stem 14 is not located at this station, the conveyor 10 moves back to position and no operations are performed by the control apparatus, but should a stem 14 now be located at said station, the circuit through the mercury switch 20 is complete and the solenoid 40 is connected to the line. The armature 41 of the solenoid 40 is connected by the link 42 to the lever 43, which at this moment is at its limit of movement to the right, as shown in Fig. 1, and turns said lever 43 to a position corresponding to that shown in both Figs. 1 and 2. The lever 43 is pivoted on the pin 44 carried by the bracket 31 and the movement thereof occurs after the transferring movement of the conveyor 10 has occurred, as the pin 45 then passes from the narrow stem portion of the L-shaped slot 46, in said lever 43, to the wider foot portion. The slotted end of the lever 43 is located in ways provided by the end of the bracket 37 and the notched wheel 47 on the lower end of the shaft 38, and during its repositioning, does not effect a change in the position of the pin 45 which is held by the arm 48 pivoted on the portion of the shaft 38 above the notched wheel 47. The lever 43, of course, will remain in this new position until the stem 14 is indexed from station A, as the mercury switch 20 will keep the control circuit closed until that time and the return sideward movement of the conveyor 10 to the left shifts lever 43 so that it pulls the pin 45 and the arm 48 to the position shown in Fig. 2. This movement of the arm 48 also shifts the pawl 49 which is mounted thereon, causing it to engage a notch in the wheel 47 and index said wheel 47 and the conveyor 11. The motion of the conveyor 11 advances an empty holder 13 into the loading station C thereof, in preparation to the next index and transferring operation of the conveyor 10, which carries the stem 14 at station A into the storage conveyor 11. The pawl 49 is kept in engagement with the periphery of the notched wheel 47 at all times by a torsion spring coiled about the pin 45, engaging both the pawl 49 and the arm 48 in the manner of the torsion spring 50 located about the pivot pin 51 of the pawl 52 at the opposite side of the notched wheel 47. The pawl 52 is attached to the bracket 37 by the pin 51, and by engaging the notches of the wheel 47, prevents it and the storage conveyor 11 from being moved backwards out of position by the sideward movement of the lever 43, which occurs as the next stem 14 is transferred thereto.

Should a stem 14 not be located at station A as the conveyors 10 and 11 separate, the lever 43 will be pulled by the contracting force of the spring 53, so that the pin 45 will be in alignment with the long narrow stem part of the L-shaped slot 46 therein, and said lever 43 and the conveyor 10 can move back and forth without disturbing the pin 45 and the storage conveyor 11. It is apparent, therefore that a stem 14 will always be located at station C on conveyor 11 except when a stem 14 is on conveyor 10 at station A or about to be transferred to the storage conveyor 11.

What I claim as new and desire to secure by Letters Patent of the United States is:

1. In combination with a conveyor having holders thereon for supporting articles of manufacture and moving them along a definite path, a second conveyor located adjacent the path of movement of the first-mentioned conveyor and having holders for receiving the said articles, means located between said conveyors for transferring said articles from the holders of said first-mentioned conveyor to those of said second-mentioned conveyor, means for indexing said second-mentioned conveyor, said first-mentioned conveyor being arranged to be bodily reciprocated, means operated by the reciprocating movement of said first-mentioned conveyor for causing the said transferring and indexing means to be operated, and means along the path of movement of said first-mentioned conveyor and operable by the presence of an article in a holder in operative relation thereto for causing said indexing means to be operated only when an article is present in said last-mentioned holder.

2. In combination with a substantially horizontal conveyor having holders projecting laterally therefrom for supporting stems for lamps or similar articles and moving them along a definite path, a second substantially horizontal conveyor having a portion located adjacent the path of movement of the first-mentioned conveyor and having holders projecting laterally therefrom for receiving said stems, means for indexing said second-mentioned conveyor, a portion of said first-mentioned conveyor being arranged to be bodily reciprocated laterally to carry one of its holders to a delivery position in alignment with a holder on said second-mentioned conveyor, means operated by the reciprocating movement of said first-mentioned conveyor for causing the said indexing means to be operated, and means along the path of movement of said first-mentioned conveyor and operable by the presence of a stem in a holder in operative relation thereto for causing said indexing means to be operated only when a stem is present in said last-mentioned holder.

JOHN FLAWS, Jr.